United States Patent [19]
Blanchard et al.

[11] Patent Number: 4,528,839
[45] Date of Patent: Jul. 16, 1985

[54] TRANSFER CALIBRATION SYSTEM

[75] Inventors: Robert L. Blanchard, Lexington, Mass.; Arthur E. Sherburne, Hollis, N.H.; Robert A. Williams, Burlington, Mass.

[73] Assignee: The Foxboro Company, Foxboro, Mass.

[21] Appl. No.: 604,544

[22] Filed: Apr. 27, 1984

[51] Int. Cl.³ .............................................. G01F 25/00
[52] U.S. Cl. .................................... 73/1 H; 73/304 C
[58] Field of Search ............................. 73/1 H, 304 C

[56] References Cited
U.S. PATENT DOCUMENTS

| 3,176,221 | 3/1965 | Stamler | 73/1 H |
| 3,236,091 | 2/1966 | Cohn | 73/1 H |
| 3,301,056 | 1/1967 | Blanchard et al. | 73/304 C |
| 3,533,286 | 10/1970 | Wescott et al. | 73/304 C |
| 3,797,311 | 3/1974 | Blanchard | 73/304 C |
| 3,830,090 | 8/1974 | Hersch | 73/1 H |
| 4,147,050 | 4/1979 | Rubel et al. | 73/1 H |

Primary Examiner—S. Clement Swisher
Attorney, Agent, or Firm—Jack H. Wu; Terrence (Terry) Martin; William E. Meyer

[57] ABSTRACT

A method and apparatus for calibrating a liquid level measurement system of the type having capacitive sensors, by simulating the electrical effects of sensors in an empty condition and their interconnecting cables, at a time when the sensors are full or partially filled. By a sequential balancing technique, using a conventional bridge circuit, a precision, highly stable variable impedance device is adjusted to individually simulate the effects of each sensor and cable combination with the sensor in an empty condition. The settings of the variable impedance device are recorded, and at a later time when the sensors are no longer empty, these settings are reproduced, so as to recreate the electrical effects of each sensor cable combination one at a time. The individual effects are separately transferred into a network having a plurality of variable impedance channels, until each channel simulates the effects of a corresponding sensor and cable. This allows all of the earlier characterized effects to be simultaneously imposed on the measurement system.

15 Claims, 5 Drawing Figures

FIG. 1 PRIOR ART

PRIOR ART

TRANSFER CALIBRATION SYSTEM

TECHNICAL FIELD

This invention relates in general to techniques for calibrating measurement systems, and in particular to a technique for accurately reproducing the electrical effects of capacitive type sensors and their interconnecting cables under prescribed conditions.

BACKGROUND ART

Various types of gauging systems are used to determine the height of a liquid level within storage tanks. These include mechanical systems (e.g., flotation devices), ultrasonic and optical systems, among others. In the storage of highly volatile fluids such as liquid natural gas (LNG), there is a particular need for a gauging system which is extremely accurate, reliable and requires minimal maintenance, because of the many safety problems and costs associated with opening the tank for access. An especially suitable system for such applications is one of the type disclosed in U.S. Pat. Nos. 3,301,056, 3,533,286, and 3,797,311. In such a system, a capacitive sensor extending along the height of the tank is oriented such that the liquid rises between its electrodes, the capacitance of the sensor being dependent on the height of the liquid between the electrodes. The sensor capacitance, as measured by an associated electronic control unit, is compared with that of a similarly constructed reference sensor which is totally immersed in the liquid, to yield an indication of the liquid height.

Often, when LNG is transferred from one tank to another, for example when being off-loaded from a shipboard tank to a shore installation or vice versa, a transfer of ownership occurs, involving an exchange of money. Since typically millions of cubic feet of LNG are involved, a measurement error of less than a percent can result in a significant error in the cost of the transaction. Therefore it is desirable to calibrate the level gauging system at specified times and after any repair of the electronics.

A typical calibration based on zero and full-scale values of sensor capacitance begins with the establishment of a reference baseline indicative of the sensor when it is totally drained of fluid. In operation, to insure an accurate determination of the liquid level, this baseline must be: (1) subtracted in some way from the measured capacitance value of the sensor, and (2) employed in some way to establish a system scale factor. Unfortunately, at the time of transfer, both the delivering tank and the receiving tank are usually partially filled; in fact, it is likely that a shore receiving tank may never be emptied. So, a direct measurement of either tank's sensor in an empty condition is usually impossible.

Until now, the calibration was performed by uncoupling from the electronic control unit the cables interconnecting the sensors to the control unit, and substituting in their place adjustable precision capacitors set to the laboratory measured "empty" values of each sensor. However, this procedure does not take into account the electrical effects of the interconnecting cables on the measurement system. In the case of a shipboard tank installation, these cables may be on the order of 250 meters in length, and for shore-based installations, up to 750 meters or so. When coupled between its sensor and the control unit, a cable introduces additional capacitance and other impedance and transmission-related effects, which produce a different net effect at the control unit than does the capacitance value of the sensor by itself. The voltage at the end of the cable differs both in magnitude an phase from the voltage at the sensor. If these effects are not accounted for, the accuracy of the calibration, and consequently of the measurement, is compromised.

Another drawback of the conventional method of calibration occurs in the case of sensors which experience abnormally rough handling in shipment or installation. In such cases the sensor capacitance may deviate from the original laboratory value. When used in rugged environments such as shipboard tanks, the sensors may undergo further small changes in capacitance over the life of the system. In this way, small errors may be introduced when calibrating the system conventionally in accordance with original laboratory measured data.

Yet another drawback of the conventional method of calibration is that the capacitive sensor often is made up of several segments, and in order to simultaneously simulate the entire sensor, several precision capacitors are needed, one for each segment. However, these capacitors tend to be bulky and quite expensive, which further complicates the procedure.

Therefore, it is an object of the present invention to provide a calibrator which can accurately duplicate the total electrical effects of a capacitive sensor and its associated cable under a predetermined set of conditions.

It is a further object of the present invention to provide such a calibrator which can interface easily with existing tank gauging systems.

DISCLOSURE OF INVENTION

The calibration technique in accordance with the present invention is adapted for use with a measurement system of the type having a plurality of measurement sensors, a control unit, and a plurality of cables, each cable interconnecting one of the sensors to the control unit, and wherein the characteristics of a sensor and its associated cable have an effect on the measurement being made. Specifically, the technique calls for one of the plurality of sensors to be established in a predetermined condition. Then a variable impedance device is set to a value corresponding to the effect on the measurement system of the combination of this sensor and its associated cable and this value is retained. This procedure is repeated for every combination of a sensor and its associated cable. Later, when at least one of the sensors is no longer in the predetermined condition, a transfer calibrator network is introduced, having a plurality of variable impedance channels, one channel for each sensor and cable combination. The sensors and their cables again are disconnected from the control unit. The variable impedance device is reset to a previously retained value corresponding to a particular sensor and cable combination, and the effect of this combination is recreated within a corresponding channel of the transfer calibrator network, in accordance with the setting of the variable impedance device. After these steps are repeated for each of the retained values, the plurality of variable impedance channels are interconnected with the control unit in place of the sensors and cables. This allows the effect of a selected sensor, in the predetermined condition, and its cable to be imposed on the control unit, whereby the measurement system can be compensated for all such effects.

In a specific embodiment of the invention, the effects of a multiple-segment sensor assembly are established within the transfer calibrator by first connecting a particular segment, in an empty condition, and its cable into a bridge circuit, in a counterbalancing relationship with a first variable impedance network incorporated within the measurement system circuitry. A test signal generated by an electronic control unit is injected into the bridge circuit, and the first variable network is adjusted until it has balanced out the effects of the sensor and cable, as evidenced by the occurrence of a null. A high-precision variable impedance standard having good long-term stability characteristics, preferably one certified by a national laboratory, is connected so as to occupy the same position within the bridge circuit as did the sensor and cable combination, and is adjusted so as to balance the first variable impedance network. This procedure is repeated for each sensor and cable, and the respective settings of the impedance standard are retained to serve as bench-marks so that its condition can be reestablished at a future time.

Later, at the time of calibration the procedure is reversed, i.e., the impedance standard is set to one of the prerecorded settings, and the first variable impedance network is balanced thereagainst. This reestablishes the first variable impedance network in its original condition. A valuable benefit derives from employing a standard traceable to a national standard. Then the retained values can be duplicated independently of the particular physical device on which the original data was obtained.

Next, the standard is disconnected and one channel of a variable impedance- and trans-admittance device (the "transfer calibrator") is connected in its place, and is adjusted so as to balance the first variable impedance network. The net result of these manipulations is that the exact characteristics of the sensor segment and its cable, as they existed at an earlier time under predetermined conditions, have been "transferred" to the transfer calibrator, without the absolute values of these characteristics having been measured.

This procedure is repeated for each sensor-cable combination until the transfer calibrator has been "programmed" to simulate each segment of the complete sensor assembly and its various connecting cables. The transfer calibrator can then be substituted accurately for the complete sensor assembly and its cables, for purposes of zero and full calibration adjustments to the control unit for each segment of the sensor, regardless of the amount of liquid within the tank.

BRIEF DESCRIPTION OF DRAWINGS

The numerous operating features and advantages of the present invention will be made clear by the following detailed description, in conjunction with the accompanying drawings in which.

BEST MODE FOR CARRYING OUT THE INVENTION

Figure 1:
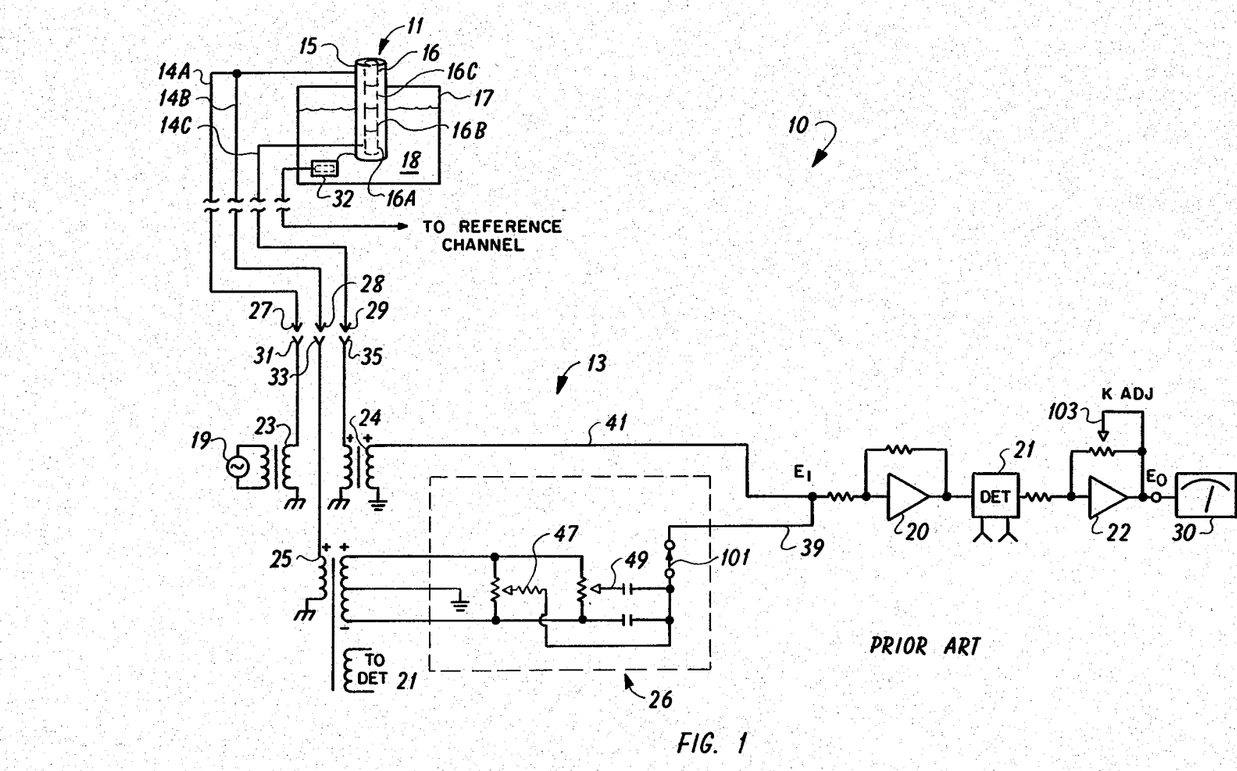
FIG. 1 is a schematic diagram showing a portion of a conventional capacative liquid level gauging system.

Referring now to FIG. 1, a conventional tank level measurement system 10 is shown, including a capacitive tank level sensor 11 interconnected with an electronic control unit, indicated generally by reference numeral 13, by means of coaxial cables 14A, 14B, 14C. This sensor is representative of a multitude of sensors distributed throughout various tanks either on a ship or a shore-based storage facility, each of which sensors interconnects with the control unit. The capacitive sensor comprises a continuous outer cylindrical electrode 15 and an inner cylindrical electrode 16, which is made up of a series of individual segments 16A, 16B, 16C, etc. Each sensor is vertically oriented within its respective tank 17 and the internal space between its inner and outer electrodes is accessible by a liquid 18 whose height is to be measured. The capacitance of the sensor increases with the rise in liquid level therein, since the dielectric constant of the liquid is greater than that of the vapor being displaced, and therefore the capacitance is an effective indicator of liquid level. An oscillator 19 provides an alternating current input signal into the sensor 11, and the resulting current output signal from the sensor drives an amplifier 20 and a phase-sensitive detector 21. The detector in turn produces a voltage which is sensed at the output $E_0$ of an amplifier 22. Since the amount of current passing through the sensor is a function of its capacitance value, the voltage at $E_0$ similarly is a function of the capacitance and consequently of the liquid level. An appropriately calibrated display device 30 is coupled to the amplifier output to indicate the liquid level measurement.

It should be pointed out that the system shown in FIG. 1 is particularly adapted for tanks carrying volatile and potentially explosive liquids, such as liquid natural gas (LNG). More specifically, transformers 23, 24, 25 within the control unit are components of larger intrinsic safety barrier units (not shown) installed for safety purposes, i.e., to limit the electrical energy present within a potentially explosive environment to intrinsically safe levels. A more detailed description of such intrinsic safety barriers, as used in tank level measurement systems of this type, is given in U.S. Pat. No. 3,797,311 (herein incorporated by reference), with respect to item 52 of FIG. 2 therein.

In order to achieve a liquid level measurement which is valid for any liquid dielectric constant, it is necessary to reference the capacitance of the sensor segment 16A, 16B, etc., being measured to that of a reference segment which is constantly filled with the liquid of interest. In the system shown in FIG. 1, in addition to a reference segment 32 employed in conjunction with the lowermost measuring segment 16A, the various sensor segments themselves function as reference segments, as they progressively become totally immersed. For example, when sensor segment 16B is partly immersed in the liquid, sensor segment 16A is completely below the surface and so can serve as the reference segment for the sensor segment 16B. As the level rises to a point at which 16B becomes submerged, then conventional logic circuitry (not shown) within the control unit automatically substitute segment 16B as the reference segment, and the next higher sensor segment 16C as the measurement segment.

Typically, a capacitance-based level measurement made by a system of the type shown in FIG. 1 is described by the equation:

$$L = K \cdot \left[ \frac{C_n(\epsilon_l - 1)(h/H) + C_n - C_{nb}}{C_r(\epsilon_l - 1) + C_r - C_{rb}} \right] \quad (1)$$

where

L is the measurement value

K is an adjustable scale factor $C_n$ is the capacitance of the empty measuring segment (16n)

$C_r$ is the capacitance of the empty reference segment $\epsilon_l$ is the dielectric constant of the liquid h is the dimension from the bottom of the segment up to the liquid level H is the length of the segment $C_{nb}$ is the equivalent capacitance value of a channel of a balancing network associated with the measuring segment "n" (shown generally at reference numeral 26, to be discussed hereinafter) and $C_{rb}$ is the equivalent capacitance value of the channel of the balancing network 26 associated with the reference segment.

It is important that the level measuring system be calibrated from time to time in order to assure accurate measurement performance over the lifetime of the tanking system. Calibration may be performed for ship tanks on convenient occasions such as regular dry docking, and for shore storage tanks on a schedule determined by owners and customs organizations, and after repairs on the control unit electronics. Calibration consists in adjusting the electronics of the control unit 13 to "match" the sensor segment and cable combinations, so that for each segment the system indication equals zero when the segment is empty and equals the length of the segment when the segment is full. Note that the calibrating procedure described hereinafter adjusts the electronic control unit 13 to perform correctly with the actual characteristics of the sensor segment and cable combination, without requiring knowledge of the absolute values of these characteristics. In prior art calibration procedures, it was assumed that laboratory-measured values of the sensor segment capacitance were correct even after shipping and installation. Further it was erroneously assumed that the effects of the interconnecting cables were negligible.

In the case of prior art systems described above (as shown in FIG. 1), typically two calibration adjustments were made, one corresponding to an empty tank condition, and the other corresponding to a full tank. In equation (1) above, when h equals zero (i.e., an empty tank), L must also equal zero. Thus the equivalent capacitance value $C_{nb}$ of the balancing network 26 must be adjusted so that $$C_{nb} = C_n \quad (2)$$

Conversely, when the tank is full, the measured value L must equal H, independent of the value of $\epsilon_l$. So, to satisfy this condition, $C_{rb}$ must be adjusted so that $$C_{rb} = C_r \quad (3)$$

and the adjustable scale factor K must be set so that $$H = K(C_n)/(C_r) \quad (4)$$

Figure 1A:
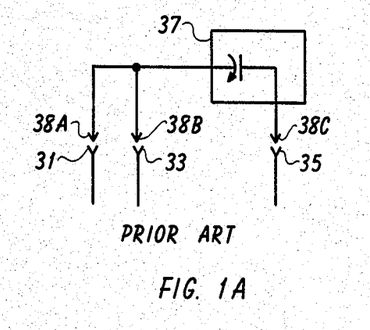
FIG. 1A is a partial view of the schematic diagram of FIG. 1, modified to show a variable capacitance standard substituted for the capacitive sensor and cables.

Referring now to FIGS. 1 and 1A, calibration adjustments are achieved within prior art systems as follows. First, it should be pointed out that the balancing network 26 has a plurality of channels, each having the circuit shown at 26, and each corresponding to a different sensor segment 16A, 16B, etc., and one corresponding to the separate reference segment 32. To set each channel of the balancing network so that $C_{nb} = C_n$ for its respective sensor segment (or $C_{rb} = C_r$ for the reference segment), the cables 14A, 14B, 14C connecting the outer electrode 15 and the sensor segment 16A (or 16B, 16C, etc.) to the control unit 13 are uncoupled from the control unit by removing plugs 27, 28, 29 from their respective mating sockets 31, 33, 35. In place of the sensor and cable combination a highly stable, precision variable capacitance standard 37 is connected to the sockets 31, 33, 35 by means of plugs 38a, 38b, 38c (see FIG. 1A). An example of such a standard is the Model 1422-CB capacitor manufactured by GENRAD Corporation. This variable capacitance standard is set to a predetermined capacitance value which represents the original laboratory-measured capacitance of the corresponding sensor segment in an empty condition. By virtue of this arrangement, the standard capacitor and the balancing network channel 26 are connected in opposing legs of a bridge-type configuration. More specifically, the equivalent capacitance value of the balancing network can be set, in a manner described below, so that the current emerging from the balancing network along a line 39 and the output current from the standard 37 on a line 41 combine to yield a net current signal of zero at point $E_1$. This in turn yields a zero (or negligible) voltage at $E_0$, as indicated on the display device 30.

With the oscillator 19 set to deliver a detectable signal level at $E_0$, potentiometers 47, 49 are sequentially adjusted so as to achieve a null at $E_0$. Adjustment of these potentiometers achieves a variable impedance effect analogous to that achieved by adjustment of the standard 37, but it does so with an economy of electrical components. Effectively, the capacitance value (i.e., $C_{nb}$) of the balancing network 26 is thus equated to the assumed capacitance value of the empty sensor segment 16A ($C_n$). This procedure, individually performed for each sensor segment (including the reference segment) using a separate channel of the balancing network for each, satisfies the conditions of equations (2) and (3).

In order to satisfy the condition of equation (4) and establish the scale factor K, it is customary in the prior art to employ two precision standard capacitors 37 simultaneously, one for the "n" channel and one for the "r" channel. More generally, is is often the case that standard capacitors are connected to all channels simultaneously. The standard capacitors are adjusted to the values $C_r(\epsilon_l = 1)$, $C_n(\epsilon_l - 1)$, etc., taking care that the same value of $(\epsilon_l - 1)$ is used for all channels, where the value of $(\epsilon_l - 1)$ is chosen appropriate to the fluids to be encountered in service. In this condition, a K ADJ potentiometer 103 is varied until a reading equivalent to the length H of the measured segment is shown on the indicator 30.

However, this conventional procedure has major shortcomings. A capacitance value equal to the laboratory-measured capacitance value of an empty sensor segment (or to that value multiplied by $(\epsilon_l - 1)$, when connected directly to the control unit 13, is not electrically equivalent to that same sensor segment at the end of the long cables 14A, 14B, 14C. The voltage at the end of the cables differs both in magnitude and phase from the voltage at the sensor segment itself, the amount of difference being dependent on both the source and load impedances, as well as the lengths and characteristics of the cables.

When consideration is given to the effects of the long interconnecting cables 14A, 14B, 14C and the transformers 23, 24, 25 to which they are connected, the conventional system description and calibration adjustments defined in equations (1) through (4) must be modified to the following more accurate form:

$$L = K \cdot \left[ \frac{(\epsilon_l - 1)(h/H)F_n T_n + C_n F_n T_n - F_c T_c^- B_n}{C_r(\epsilon_l - 1)F_r T_r + C_r F_r T_r - F_c T_c^- B_r} \right] \quad (5)$$

where the terms additional to those defined for (1) are:

$F_n$ = transfer function of cable 14C in channel "n"
$T_n$ = transfer function of the intrinsic safety barrier containing transformer 24 in channel "n"
$F_r$ = transfer function of cable from reference segment to intrinsic safety barrier in channel "r"
$T_r$ = transfer function of the intrinsic safety barrier in channel "r"
$F_c$ = transfer function of cable 14B
$T_c^-$ = transfer function of the intrinsic safety barrier containing transformer 25, negative polarity
$B_n$ = trans-admittance of balancing network 26 in channel "n"
$B_r$ = trans-admittance of balancing network 26 in channel "r"

From equation (5) it is evident that the desired system adjustments become $$C_n F_n T_n = F_c T_c^- B_n \quad (6)$$

$$C_r F_r T_r = F_c T_c^- B_r \quad (7)$$

$$H = K_n \cdot \left[ \frac{C_n F_n T_n}{C_r F_r T_r} \right] \quad (8)$$

the adjusted components being $B_n$, $B_r$ and $K_n$ respectively.

Figure 2:
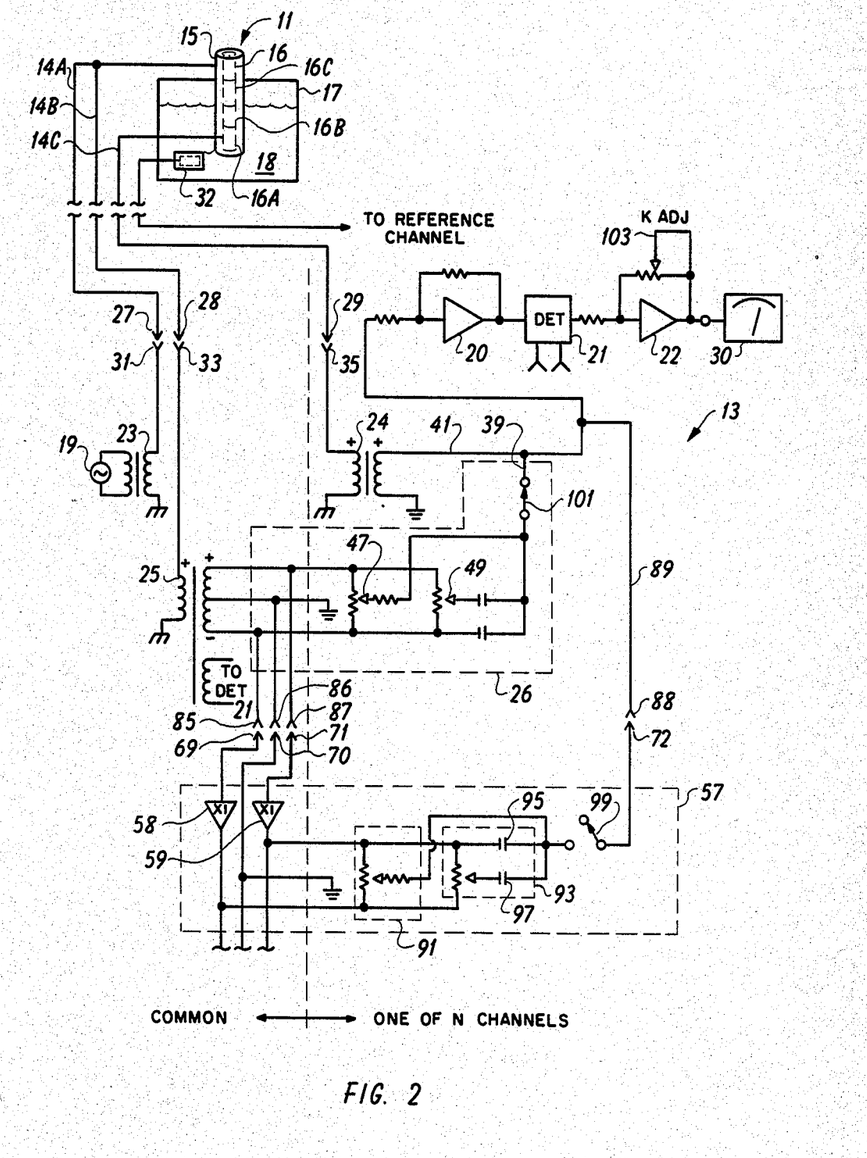
FIG. 2 is a schematic diagram of the measurement system modified to include a transfer calibrator network built in accordance with the present invention.

Referring now to FIG. 2, the tank level measurement system schematic of FIG. 1 has been modified in accordance with the present invention. Components marked with the same reference numerals as in FIG. 1 are identical to the corresponding components of FIG. 1. A transfer calibrator network 57 has been inserted into the circuitry of control unit 13, in a counterbalancing relationship with the network 26. This arrangement preserves the intrinsic safety provided by the transformers 23, 24, 25 and their associated barrier components (not shown).

The transfer calibrator network can be implemented as an integral part of the control unit 13 or, as shown in FIG. 2, can be constructed as a portable unit for use with existing systems. To facilitate this latter mode, plugs 69, 70, 71, 72 of the transfer calibrator connect directly to respective sockets 85, 86, 87, 88, which communicate with the balancing network 26. Furthermore, follower amplifiers 58, 59 are interposed between the balancing network 26 and the other components of the transfer calibrator 57 so that connection and removal of the calibrator can be performed with negligible disturbance to the measurement system electronics.

The transfer calibrator network 57 includes a first variable impedance network 91, known as the "quadrature" adjustment and a second variable impedance network 93, known as the "in-phase" adjustment, in similar fashion to the configuration of the balancing network 26. The second variable impedance network 93 in turn consists of the parallel arrangement of a fixed nominal capacitor 95 and a trim capacitor 97. A switch 99 allows the transfer calibrator network to be selectively disconnected from the surrounding control unit 13 circuitry for performing certain operations as hereinafter described. As in the balancing network 26, the transfer calibrator has multiple "channels", one for each sensor-and-cable combination, each channel being essentially a duplicate of the one depicted at reference number 57. For the sake of simplicity, only one channel is represented in FIG. 2. A particular advantage achieved by addition of the transfer calibrator network 57 is realized if the impedance and trans-admittance effects to be stored therein are those which reflect the conditions existing when the sensor is completely empty. Naturally these conditions can be observed only at some point in the lifetime of the measurement system when all the sensor segments are actually empty, such as during initial installation, or for ship systems during drydocking. Then at some future time when most of the sensor segments are either completely or partially filled, and it is necessary to calibrate the same system, the transfer calibrator network can be inserted into the control unit circuitry to recreate these initial conditions. Years of experience in the operation of systems of this kind have shown that the impedance and trans-admittance effects of both the sensor segments and their associated cables are quite stable over time. Therefore it can safely be assumed that these effects at the time of calibration will be identical to those at initial characterization, as described above.

OPERATION

Initial characterization.

With reference now to FIG. 2, the operation of the disclosed embodiment of the invention is as follows. Initially, with sensor 11 empty, the sensor segments 16A, 16B, etc., control unit 13, and interconnecting cables 14A, 14B, 14C are connected as shown for normal system operation. The switch 101 is closed, the transfer calibrator switch 99 is open and the variable elements 47, 49 of the appropriate channel of the balancing network 26 are adjusted sequentially to achieve a voltage null at E$_0$. This adjustment, which is performed for each channel of the system satisfies the conditions of equations (6) and (7). Because of the counter-balancing relationship between the balancing network on the one hand and each sensor segment 16A/cable 14A, 14B, 14C combination on the other, the balancing network now represents, in essence, the "negative" of the total impedance and transmission effects of the sensor segment-cable combination. It is "negative" in the sense that the balancing network generates currents of the form E(X−jY) which counterbalance the E(A+jB) currents supplied by the sensor-and-cable combination. Changes in both the magnitude and sign of X are achieved by varying the "quadrature" adjustment 47, while the magnitude of Y is changed by varying the "in-phase" adjustment 49.

Now that these "negative" effects have been achieved within the balancing network 26, a "positive" re-creation of these same impedance effects can be established using a calibrator standard 37', which is a modified version of the standard 37 of FIG. 1A.

In order to substitute for and represent the complex (in the algebraic sense of $(X+iY)$) impedance and transmission characteristics of the sensor-and-cable combination, the calibrator standard 37' (see FIG. 2A) includes a series-connected three terminal variable capacitor 37'A and a variable resistor 37'B. Although this arrangement is suitable for many systems, more than one size of each component may be required, depending on the range of values of sensor-and cable characteristics. The capacitor and resistor are highly stable, resettable, precision components such as those which can be certified by a national standards laboratory or equivalent, e.g., capacitors types 1422-CB, 1422-CL, 1403D, and resistor types 1432-M, all manufactured by GENRAD Corporation. When it is desired to improve the accuracy of recording and resetting of the calibrator standard, a precision bridge such as the GENRAD Type 1615A may be used to measure the adjusted values of the components 37'A, 37'B, and to reset them accordingly.

Zero and full adjustments.

Figure 2A:
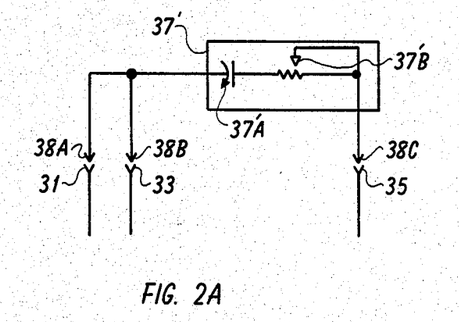
FIG. 2A is a partial view of the schematic diagram of FIG. 2 showing connections employed when using the calibrator standard.

Zero adjustment of the measurement system 10 (for calibration purposes) can be performed regardless of the amount of liquid in the tank, by recreating the characteristics of each sensor in an empty condition and its associated cable as follows. The standard 37'A is connected as shown in FIG. 2A. The calibrator standard is set to the values previously recorded for a particular channel ("n" or "r"), the switch 101 for that channel remains closed, and the switch 99 remains open. In this condition, since the calibrator standard values are those for $h=o$, it is evident from equation (5) that the voltage $E_0$ in channel "n" is given by:

$$E_0 = A(C_n F_n T_n - F_c T_c - B_n) \qquad (9)$$

where "A" is a scale factor. The adjustable components 47, 49 of the balancing network 26 control the values of the two parts of the complex term "$B_n$". The "zero" adjustment is accomplished therefore when the components 47, 49 of the network 26 are adjusted sequentially for a voltage null at $E_0$, thereby satisfying equation (6). The procedure is repeated for each channel.

Figure 2B:
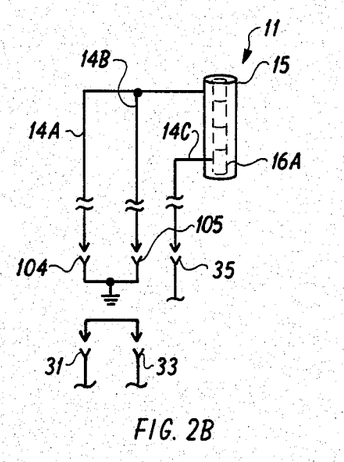
FIG. 2B is a partial view of the schematic diagram of FIG. 2 showing connections employed when using the transfer calibrator.

Again, as discussed above, each channel of the balancing network represents the "negative" of the total impedance and transmission effects of the corresponding sensor segment-cable combination. The condition existing at the time of initial characterization (as described above) has been recreated. In order to achieve a representation of the "positive" effects of all sensor segmentscable combinations simultaneously, the calibrator standard 37' is disconnected from sockets 31, 33, 35 and is replaced by the sensor 11 reconfigured as shown in FIG. 2B, i.e., with cables 14A, 14B shorted to ground via sockets 104, 105. With the switch 101 for a particular channel in the balancing network 26 still closed, the switch 99 of the corresponding channel of the transfer calibrator network 57 is itself closed. The variable components 91, 93 then are adjusted sequentially to again achieve a null voltage at $E_0$. This "transfer" from the balancing network to the transfer calibrator network is repeated channel by channel. Upon completion, the "positive" impedance and transmission effects, which previously had been represented within the calibrator standard one channel at a time are represented simultaneously in the various channels of the transfer calibrator network. The adjustments have achieved two conditions:

FOR ZERO ADJUSTMENT: Empty sensor current (line 41) minus network 26 current (line 39) equals zero;

FOR CALIBRATOR ADJUSTMENT: Transfer calibrator current (line 89) minus network 26 current (line 39) equals zero.

Therefore, the current supplied on a line 89 by the transfer calibrator network is an exact substitute for the current supplied on line 41 from the corresponding empty sensor segment.

FULL adjustment of the system (i.e., recreation of the characteristics of each sensor in a full condition and its associated cable) similarly can be performed regardless of the amount of liquid in the tank. First, the sensor is reconfigured as shown in FIG. 2B, with cables 14A, 14B shorted to ground via sockets 104, 105, and sockets 31, 33 connected together by a jumper. With both switches 101 and 99 closed, the variable components 91, 93 in the transfer calibrator are adjusted sequentially for a voltage null at $E_0$, one channel at a time until all channels have been adjusted. The transfer calibrator has now been prepared for making FULL calibration adjustments. In order to minimize any spurious effect on the system scale factor when switch 99 is closed, it is desirable to design network 57 so that the source impedance looking into the junction of capacitors 95 and 97 is relatively high and is the same in all channels. Similarity of impedance can be achieved by adding an additional impedance (not shown) connected from the junction of capacitors 95 and 97 to ground as necessary. It is further desirable that the impedance looking into line 41 from switch 99 be independent of switch 101 position.

To make FULL adjustments the balancing network switches 101 in the channel corresponding to the lowest segment 16A (channel 1) and in the channel corresponding to the reference segment are opened. In this condition since $h=0$ in both channels and the $B_n$ and $B_r$ terms have been made zero by opening these switches, equation (5) becomes:

$$L = K_n \cdot (C_n F_n T_n \div C_r F_r T_r) \qquad (10)$$

The FULL adjustment is then accomplished by manipulating the $K_1$ ADJ potentiometer 103 for an indication at $E_0$ (in channel 1) corresponding to the full length of segment 16A thereby satisfying the desired condition of equation (8). Then the network switch 101 for channel 2 is opened and the $K_2$ ADJ potentiometer (not shown, but analogous to the $K_1$ ADJ 103) is repositioned for an indication at $E_0$ (in channel 2) corresponding to the length of the segment 16B. This procedure is repeated for each segment 16C, etc., until the remaining values of $K_n$ are appropriately adjusted. The condition of equation (8) has now been achieved for all channels and the cable connections can be restored to the normal operating condition (see FIG. 2).

Note that in equations (6), (7), and (8) the "F" terms represent the magnitude and phase of signal transfer through cables and the "T" terms represent the magnitude and phase of signal transfer through the transformers 23, 24, 25. These are complex terms of the form $(X+iY)$ and accordingly $B_n$ and $B_r$ are also complex numbers. Acordingly there is provision in the balancing network 26 for two approximately orthogonal adjustments (via components 47, 49) to achieve the desired null condition. Similarly, since the calibrator standard must duplicate accurately the characteristics of the circuit containing the balancing network 26, the calibrator standard 37' also must provide two approximately orthogonal adjustments (via components 37'A, 37'B) to achieve the desired null condition. This condition is not achieved in conventional systems which provide only a variable capacitance standard, and it is evident that such a single component standard is not a sufficient substitute for the sensor segment plus cable combination, when making the adjustments to satisfy equations (6), (7), and (8).

It should be pointed out that for applications such as storage tanks the various channels of the transfer calibrator 57 are not intended to be permanently configured to reflect any particular initial conditions. This would detract from the ability to use a single transfer calibrator network to calibrate many different gauging systems. Also it is disadvantageous to require the impedance characteristics of the transfer calibrator network itself to be stable over a prolonged time. If each of the variable imedance devices within the various multiple channels of the transfer calibrator, such as the quadrature and in-phase adjustments, were to be high precision standards as described above, then it would be a simple matter of recording the settings which produce the desired null at $E_0$, so that they can be easily reproduced at some future time. However, such an arrangement would be impractical and expensive because of the high cost and unwieldiness of such standard units. Instead, a single high precision standard is used as described above to properly reconfigure each channel of the transfer calibrator network at the appropriate time.

In applications where the tanks are fully drained on predictable occasions, such as ship tanks at drydocking, a configuration is advantageous in which the transfer calibrator is equipped with resettable dials and components having stability similar to those in the balancing network 26 of the measuring system. This relatively small and convenient unit can be employed to restore the calibration of the system following control unit repair or replacement in order to continue service until the next planned occasion for recalibration employing the calibration standard 37'.

Clearly, certain modifications and substitutions to the disclosed embodiment may become apparent to those skilled in the art, but which do not depart from the spirit of the present invention. For example, the measurement system to which the present invention is adapted can be non-electrical, e.g., pneumatic or optical. Nevertheless, it is intended that such modifications be included within the scope of the following claims.

We claim:

1. A method for calibrating a measurement system of the type having a plurality of measurement sensors, a control unit and a plurality of cables, each of said cables interconnecting one of said sensors to said control unit, and wherein the combination of a sensor and its associated cable has an effect on the measurements made by said system, said method comprising the steps of:
(A) establishing one of said plurality of sensors in a predetermined condition;
(B) setting a variable impedance device to a value corresponding to the effect on said measurement system of the combination of said sensor and its associated cable;
(C) retaining said value of said variable impedance device;
(D) repeating steps (A) through (C) for each of said plurality of sensors and its associated cable;
(E) at a later time when at least one of said sensors is no longer in said predetermined condition, performing the steps of
  (i) providing a transfer calibrator network including a plurality of variable impedance channels, there being at least one such channel for each sensor and cable combination;
  (ii) resetting the variable impedance device to a previously retained value corresponding to a particular sensor and cable combination;
  (iii) recreating said effect of said particular sensor and cable combination within a corresponding one of said plurality of variable impedance channels, in accordance with the variable impedance device as configured in step (E)(ii);
  (iv) repeating steps (E)(ii) through (E)(iii) for each of said retained values; and
  (v) selectively interconnecting said plurality of variable impedance channels with said control unit, in place of said plurality of sensors and plurality of cables, so as to impose on said measurement system the effect of a selected sensor in said predetermined condition and its associated cable;

whereby the effects of all said sensors in said predetermined condition and their associated calbes are simulated in the measurement system.

2. The method as set forth in claim 1, wherein said step of establishing comprises placing said sensor in an empty condition.

3. The method as set forth in claim 1, wherein said sensors are capacitive, said control unit is electrical, and said effect is an impedance-and-transmission-related effect.

4. The method as set forth in claim 3, wherein said step of setting a variable impedance device comprises the steps of:
placing said sensor and cable combination in an arm of a bridge circuit, in a counterbalancing relationship with a first variable impedance network;
adjusting the impedance of said first variable impedance network to balance out said sensor and cable combination;
replacing said sensor and cable combination within the bridge circuit by said variable impedance device; and
adjusting the impedance of said variable impedance device to balance out said first variable impedance network.

5. The method as set forth in claim 4, wherein said variable impedance device has long term impedance stability characteristics.

6. The method as set forth in claim 4, wherein said step of recreating said effect comprises the steps of:
adjusting the impedance of said first variable impedance network to balance out said variable impedance device as configured in steps (E)(ii);
replacing said variable impedance device within the bridge circuit by said variable impedance channel of said transfer calibrator network;
adjusting said variable impedance channel to balance out said first variable impedance network.

7. The method as set forth in claim 6, wherein said variable impedance device, said first variable impedance network and said variable impedance channels have variable resistance and variable capacitance components.

8. A method for calibrating a measurement system of the type including a plurality of capacitive sensors, and a plurality of cables, each of said cables interconnecting one of said sensors to said control unit, and wherein the combination of a sensor and its associated cable have impedance and transmission-related effects on the measurements made by said system, said method comprising the steps of:

(A) establishing one of said plurality of capacitive sensors in a predetermined condition;

(B) interconnecting, as opposing arms within a bridge circuit,
  (i) the combination of said capacitive sensor and its associated cable, and
  (ii) a first variable impedance network;

(C) adjusting said first variable impedance network so as to balance out said capacitive sensor and cable combination;

(D) replacing said sensor and cable combination within said bridge circuit by a variable impedance standard;

(E) adjusting the impedance of said variable impedance standard so as to balance out said first variable impedance network, whereby the impedance-and-transmission related effects of said sensor and cable combination on said measurement system are duplicated within said variable impedance standard;

(F) retaining the impedance setting of said variable impedance standard required to achieve said balance;

(G) repeating steps (A) through (F) for every combination of a sensor and its associated cable;

(H) at a later time, when at least one of said capacitive sensors is no longer in said predetermined condition, performing the steps of:
  (i) resetting the variable impedance standard to a previously retained value corresponding to a particular sensor and cable combination;
  (ii) adjusting said first variable impedance network so as to balance out said variable impedance standard as configured in step (H)(i);
  (iii) replacing said variable impedance standard within said bridge circuit by one of a plurality of variable impedance channels of a transfer calibrator network, there being one such channel for each sensor and cable combination;
  (iv) adjusting said variable impedance channel so as to balance out said first variable impedance network, whereby the impedance-and-transmission related effects of said particular sensor in said predetermined condition and its associated cable are recreated within said variable impedance channel;
  (v) repeating steps (H)(i) through (H)(iv) for each of said retained values; and
  (vi) selectively interconnecting said plurality of variable impedance channels with said control unit, in place of said plurality of sensors and plurality of cables, to impose on said measurement system the impedance- and transmission-related effects of a selected sensor in said predetermined condition and its associated cable;

whereby the impedance- and transmission-related effects of all said sensors in said predetermined conditions and their associated cables are simulated in the measurement system.

9. The method as set forth in claim 8, wherein each of said first variable impedance networks, said variable impedance standard and said variable impedance channel have variable resistance and variable capacitance components.

10. The method as set forth in claim 8 wherein the step of establishing comprises placing said capacitive sensor in an empty condition.

11. The method as set forth in claim 8 further comprising the steps of:

injecting a test signal from said control unit into said bridge circuit; and determining the occurrence of a balance between the respective opposing components in each of steps (C), (E) and (H)(ii) by the occurrence of a predetermined response of said test signal.

12. The method as set forth in claim 11, wherein said predetermined response of said test signal is a null.

13. The method as set forth in claim 8, wherein said variable impedance standard has long-term impedance stability characteristics.

14. Apparatus for calibrating a measurement system of the type having a plurality of measurement sensors, a control unit and a plurality of cables, each of said cables interconnecting one of said sensors to said control unit, and wherein the combination of a sensor and its associated cable has an effect on the measurements made by said system, said apparatus comprising:

a plurality of information transfer channels, there being at least one such channel for each sensor and cable combination;

means for individually simulating the effect on said measurement system of each combination of a sensor in a predetermined condition and its associated cable;

means for transferring the individually simulated effects of all said sensor and cable combinations into respective ones of said plurality of information transfer channels; and means for interconnecting said plurality of information transfer channels to said control unit, in place of said plurality of sensors and plurality of cables, whereby the effects of all said sensors in said predetermined condition and their associated cables are simultaneously imposed on said measurement system.

15. Apparatus as set forth in claim 14, wherein each of said information transfer channels comprises a variable impedance device.

* * * * *